United States Patent [19]
Ratcliff et al.

[11] Patent Number: 5,987,515
[45] Date of Patent: Nov. 16, 1999

[54] INTERNET PROTOCOL ASSISTS USING MULTI-PATH CHANNEL PROTOCOL

[75] Inventors: Bruce H. Ratcliff, Red Hook; Stephen R. Valley, Valatie, both of N.Y.

[73] Assignee: International Business Machines Corporation, Armonk, N.Y.

[21] Appl. No.: 08/920,587

[22] Filed: Aug. 29, 1997

[51] Int. Cl.$^6$ .................................................. G06F 15/16
[52] U.S. Cl. .......................... 709/224; 709/225; 709/229; 707/10
[58] Field of Search .................................. 709/22.4, 236, 709/235, 245, 239, 218, 226, 223, 238; 370/257, 402, 338, 400, 392, 390, 463; 707/10; 711/121

[56] References Cited

U.S. PATENT DOCUMENTS

| | | | |
|---|---|---|---|
| 4,677,588 | 6/1987 | Benjamin et al. | 709/228 |
| 5,159,592 | 10/1992 | Perkins | 370/338 |
| 5,185,860 | 2/1993 | Wu | 709/224 |
| 5,237,659 | 8/1993 | Takats | 709/236 |
| 5,278,829 | 1/1994 | Dunlap | 370/257 |
| 5,425,023 | 6/1995 | Haraguchi et al. | 370/400 |
| 5,426,427 | 6/1995 | Chinnock et al. | 709/238 |
| 5,430,727 | 7/1995 | Callon | 370/401 |
| 5,442,630 | 8/1995 | Gagliardi et al. | 370/402 |
| 5,463,625 | 10/1995 | Yasrebi | 370/401 |
| 5,473,608 | 12/1995 | Gagne et al. | 370/401 |
| 5,475,601 | 12/1995 | Hwang | 364/473.01 |
| 5,491,693 | 2/1996 | Britton et al. | 370/401 |
| 5,519,858 | 5/1996 | Walton et al. | 709/218 |
| 5,524,254 | 6/1996 | Morgan et al. | 709/245 |
| 5,596,579 | 1/1997 | Yasrebi | 709/304 |
| 5,636,216 | 6/1997 | Fox et al. | 370/402 |
| 5,684,954 | 11/1997 | Kaiserswerth et al. | 709/236 |
| 5,751,970 | 5/1998 | Bournas | 709/236 |
| 5,790,541 | 4/1996 | Patrick et al. | 370/392 |
| 5,809,254 | 10/1997 | Matsuzono | 709/235 |
| 5,822,319 | 5/1996 | Nagami et al. | 370/392 |

OTHER PUBLICATIONS

Kris Jamsa, Ph.D. (Internet Programming), Jan. 1995.

*Primary Examiner*—Moustafa M. Meky
*Assistant Examiner*—Chuong Ho
*Attorney, Agent, or Firm*—Lily Neff

[57] ABSTRACT

A method of allowing any initiating host to establish communications with any receiving host in a computing network using a Multi-path channel communication protocol. The computing environment also having a gateway device that is electronically connected from one end to at least one initiating host and at the other end to at least one local area network through which a plurality of hosts are connected to the gateway device. During an initialization step all functions commercially available on all communication platforms are inputted in a special function table. Then the particular associated platform is queried and the functions provided in the computing environment is determined and inputted also in the function table. All alterations and modifications to the availability of old functions or addition of new functions are also monitored and inputted in the table. In this manner any host connected to the gateway device can obtain a list of all available functions supported by the communication platform at any one time and if desired, even any such host can chose a function from this list of available functions.

10 Claims, 5 Drawing Sheets

* ONE SETASSTPARMS COMMAND NEEDED FOR EACH IP ASSIST TO BE ENABLED

INTERNET PROTOCOL ASSISTS USING MULTI-PATH CHANNEL PROTOCOL

FIELD OF INVENTION

The present invention is generally directed to an expanded control command interface that can support network connections to gateway devices without dealing with configuration complexities.

BACKGROUND OF THE INVENTION

Personal computers are gaining widespread popularity as the state of technology is improving. Over the past few decades, their utilization has profilerated both for personal purposes and for use in business and scientific communities. Establishing good computing communications have become a necessity as individual users try to connect to one another for exchange of information, and to larger computers to take advantage of their higher processing capabilities. This need to communicate between different computing hosts or nodes have evolved into the creation of distributed networks. A distributed network is an aggregate of individual systems that are connected to one another electronically. Distributed networks can be organized in a number of ways, either remotely extending over great distances using wide area networks or WANs, or locally through the use of a Local Area Network, better known as a LAN.

A LAN usually consists of a number of nodes or hosts located within an office, a building or at other close proximations. Being a type of a distributed network, a LAN loosely couples processors and workstations. Generally, workstations on a LAN do not share a central memory but do share common servers. In this way a LAN increases the power and flexibility of workstations by enabling them to access shared data without jeopardizing the security of each individual resource.

A LAN system that has been in wide use in recent years is produced by Novell, Inc. of Provo, Utah. In a Novell system, a LAN device driver is implemented on top of the local operating systems to be coupled and device driver commands at the LAN workstations are directed to and from the workstations onto the LAN to the target servers.

As networks have grown and particularly as LANs have come into widespread use, many businesses and organizations have faced the necessity of interconnecting and managing a confederation of networks and LANs. Each network itself can in turn comprises of a plurality of logical networks which in turn run independent and different networking protocols. The challenge has not become only to interconnect local area networks to one another, but to do so and still provide remote server access through WANs or other devices.

Three basic methods are now available to interconnect both local and remote area networks to one another as to provide wide used access and remote information exchange capabilities. These three methods are 1) bridges or data-link devices that connect similar networks together; 2) routers that perform routing services by maintaining a routing table in each host; and 3) gateway devices that carry out protocol conversions and other connectivity functions. Typically, a device driver for the gateway is provided with modems or other physical ports that can be linked to switched communication WANs.

A gateway facility allows the interconnection of multiple independently controlled communication networks to one another in a way that logical units in the network can communicate with one another without any changes to the network. A logical network runs a single networking protocol, but a processing organization can be composed of a dozen of logical networks running six or seven networking protocols. A gateway provides transparent interconnection of these single networking protocols, so that a single multiport transport network is formed.

In the existing mechanisms, gateway devices are implemented on top of the LAN device drivers as a switched communications device interface. The user initialization of the communication link-up procedure redirects the user hardware commands to the gateway. The communications interface in the gateway driver then institutes and maintains the switched communications link, diverting hardware resources of the driver to do so. The connection and access procedures are then executed using the gateway ports and modems in order to link the user's system with the switched communications network. A remote connection is established through the LAN/WAN which sets up a point to point configuration through the port along the communication line between the user and the communications device in use.

The procedure described above have many complexities associated with it. The complexities connected with the configuration assessment of gateway devices is an on-going concern of the designers of such devices today. These configuration concerns contributes to many limitations that exist with today gateway devices. These limitations often make the interconnection of networks running different protocols non-transparent. Because many of the present gateways are transport layer protocol-specific, it is possible that a gateway cannot interconnect a network running for example a TCP/IP protocol and a network running the SNA protocol. Furthermore, a variety of gateway devices have been developed which connect TCP/IP to different operating system and give connectivity to the LAN/WAN environments, but each time the configuration has to be redefined and reassessed before connectivity is accomplished successfully. Furthermore, each gateway device can usually implement only a subset of the TCP/IP functions. Most currently existing gateway devices do not support many of the TCP/IP functions and performance problems have been encountered due to increased bandwidth of the LAN/WAN arenas. One of the communication protocols used to communicate with the gateway is LCS or LAN Channel Station. A control command interface exists in the LCS protocol that requires all the configuration information to be set prior to the TCP/IP connect sequence. Nonetheless, the control interface does not have a command sequence to enable the use of the TCP/IP functions which have been implemented in the gateway devices. To reduce the complexity of configuring gateway devices, an expanded control command interface is needed.

This application is being filed with the following related applications on the same date—Ser. Nos. 08/921,432, still pending; 08/921,865 still pending; Ser. No. 08/921,433 still pending; 08/921,441 still pending; 08/924,007 still pending; 08/924,006 still pending; 08/920,533 still pending; 08/924,018 still pending; 08/924,022 still pending; 08/921,434 still pending; 08/920,588 still pending.

SUMMARY OF THE INVENTION

A method of allowing any initiating host to establish communications with any receiving host in a computing network using a Multi-path channel communication protocol. The computing environment also having a gateway device that is electronically connected from one end to at least one initiating host and at the other end to at least one local area network through which a plurality of hosts are connected to the gateway device. The method presented comprising the steps of first performing an initialization step during which all possible functions provided by any type of communication platform that is commercially available is specified and stored in a special function table accessible by the gateway device. During a querying step the particular functions supported by associated communication platform present in the computing environment is determined and identifying in the special function table against all possibly available commercial functions.

When new functions are provided or deleted in the computing environment, all such changes and alterations are dynamically monitoring and inputted in the special function table so that the table is kept updated with all available functions at all times. In this manner any host connected to the gateway device can obtain a list of all available functions supported by the communication platform at any one time and if desired, even any such host can chose a function from this list of available functions.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
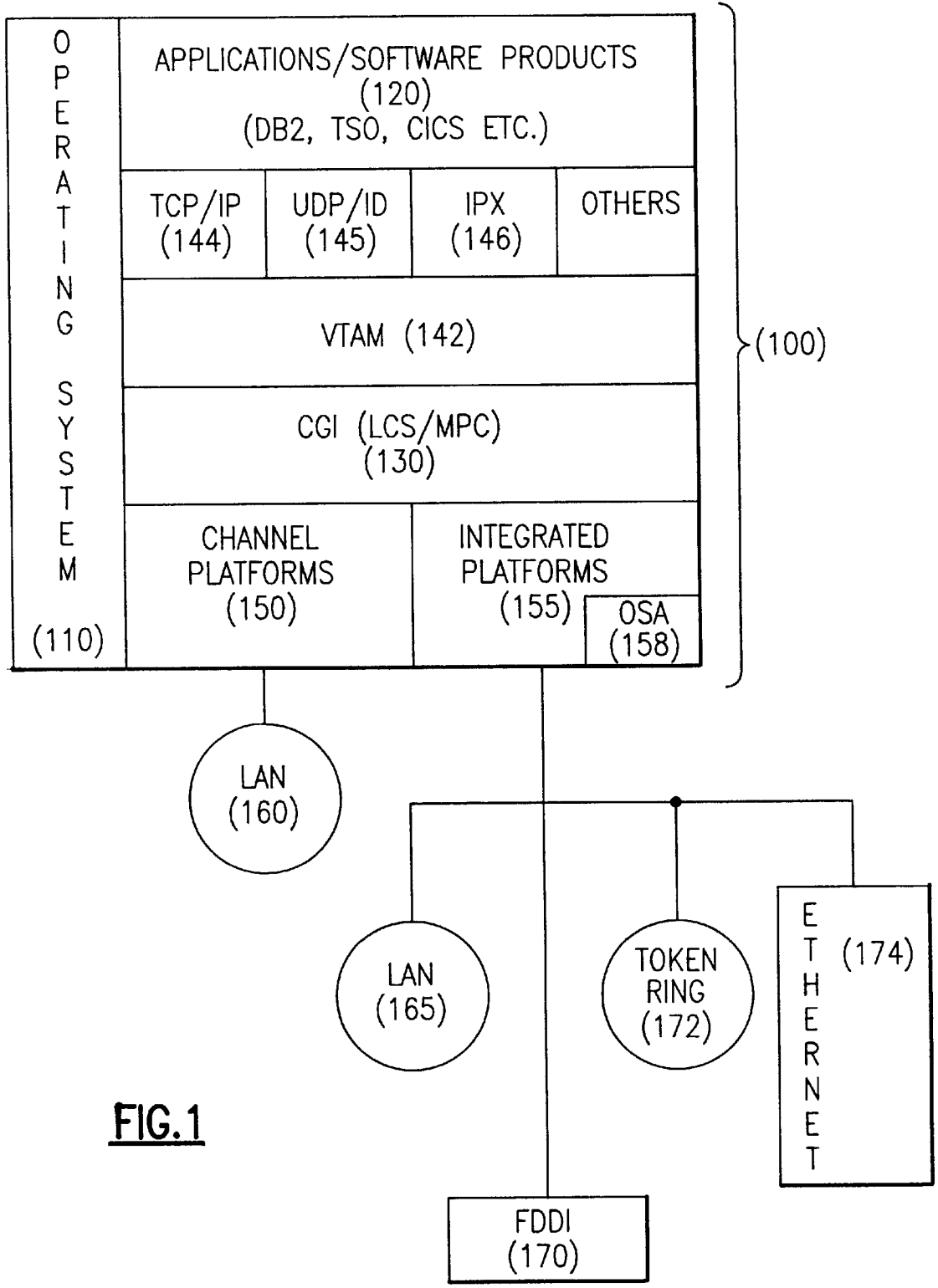
FIG. 1 is a block diagram illustration of a computing environment.

FIG. 1 is an illustration of an example showing the connection of large computing network environment, such as one provided by a large mainframe computer, to a Local Area Network (LAN) and the Internet. The large rectangle in FIG. 1 shown at 100 is a computing network environment such as an IBM S/390 computer. The operating system(s) for the computing environment is shown as 110 and can be one of many available operating systems such as OS/390 or MVS/ESA. At the next layer, shown at 120, the software products and applications reside, some examples being DB2, TSO, CICS, and IMS. The Common Gateway Interface or CGI is shown at 130 and interfaces with the communication devices such as an IBM Internet Connection Server, to access VTAM (shown at 142), TCP/IP (shown at 144), IPX (shown at 146) or other similar communication protocols. The network connection to the LAN and/or Internet (shown at 160–174) can be accomplished by means of any indicated communications controller or such as an Open Systems Adapter connection, hereinafter OSA. The network connection from the computing environment servers can be a channel (150) or an integrated platform (155) connection. An Open System Adapter or an OSA shown at 158 is an integrated connectivity platform and a product of IBM Corp. of Armonk. OSA provides direct attachment to token ring (shown at 172), ethernet (shown at 174), FDDI's or fiber distributed data interfaces, and ATM (not shown). Multiple host systems can be accessed from a single workstation through a single OSA LAN/WAN port. Integrated on the OSA card is a channel adapter, a control unit and LAN adapters. OSA supports a variety of communication protocols, namely SNA/APPN, TCP/IP and IPX. OSA allows the sharing of applications and/or LAN ports among logical partitions.

There are many protocols used to connect the communication stacks, for example an MVS TCP/IP Stack to a channel attached platform or an integrated platform such as the OSA. One such platform protocol is known as an LCS or LAN Channel Station. LCS provides an efficient method of transferring data across the I/O subsystems by blocking multiple LAN frames together in one common chain. In the following sections, the teachings of the present invention may be described in reference with a system using OSA and LCS to communicate with the MVS operating system in a setup using TCP/IP. However, the workings of the present invention is not limited to the use of OSA, LCS, TCP/IP and MVS and any such reference will be used for demonstrative purposes only.

A variety of gateway devices have been developed which connect to TCP/IP and give connectivity to LAN/WAN environment. In the existing systems, when a host is communicating with a LAN or other similar networks a Media Access Control Header, also known as a MAC Header, along with the LAN type, has to be first established so that the host and the LAN understand what kind of device and at what address the communication is being determined to address the particular needs of one another. Building a MAC header is not an easy task. In a large communicating environment, each time the host and LAN devices communicate a MAC Header has to be created which can be both inefficient in terms of time and memory consumption. Each time communication is to be established information including the device(s) address on both the sending and receiving ends, MAC header, LAN type, device type, protocol versioning and the like has to be exchanged. This process requires substantial spending of both time and memory. The present invention, however, introduces a concept which makes the formation of MAC headers and providing of such aforementioned information each time between the initiating host and receiving device obsolete. This will save latency, memory capacity and introduces efficiency on memory moves especially on the initiating host's side. The host no longer has a requirement to know any LAN/WAN specific information.

Figure 2:
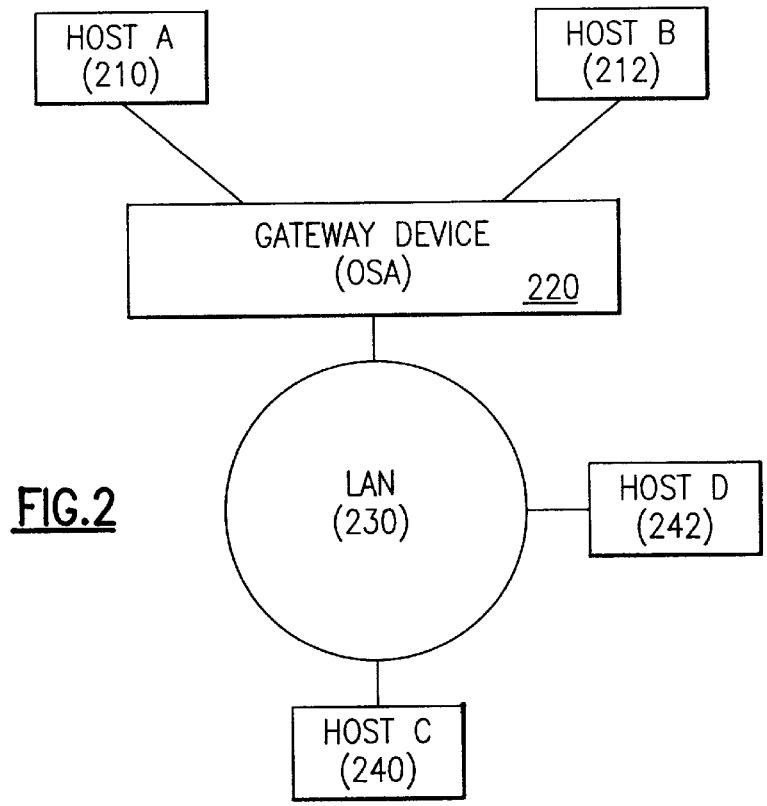
FIG. 2 is another block diagram illustration of a computing environment having a gateway device and a plurality of hosts.
Figure 3:
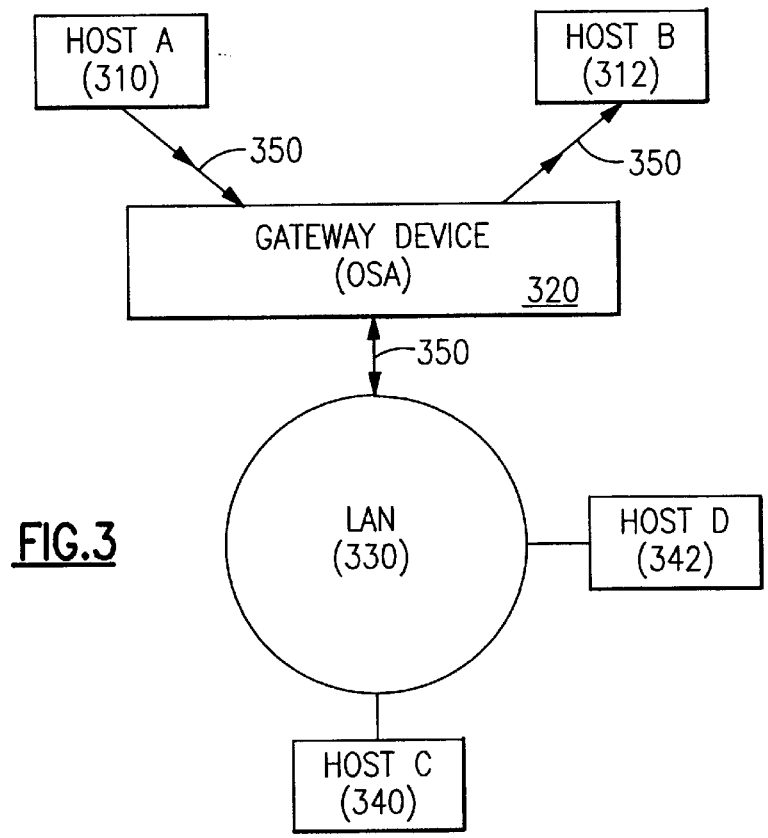
FIG. 3 is another illustration of the block diagram shown in FIG. 2 with arrows indicating the existing flow of information.
Figure 4:
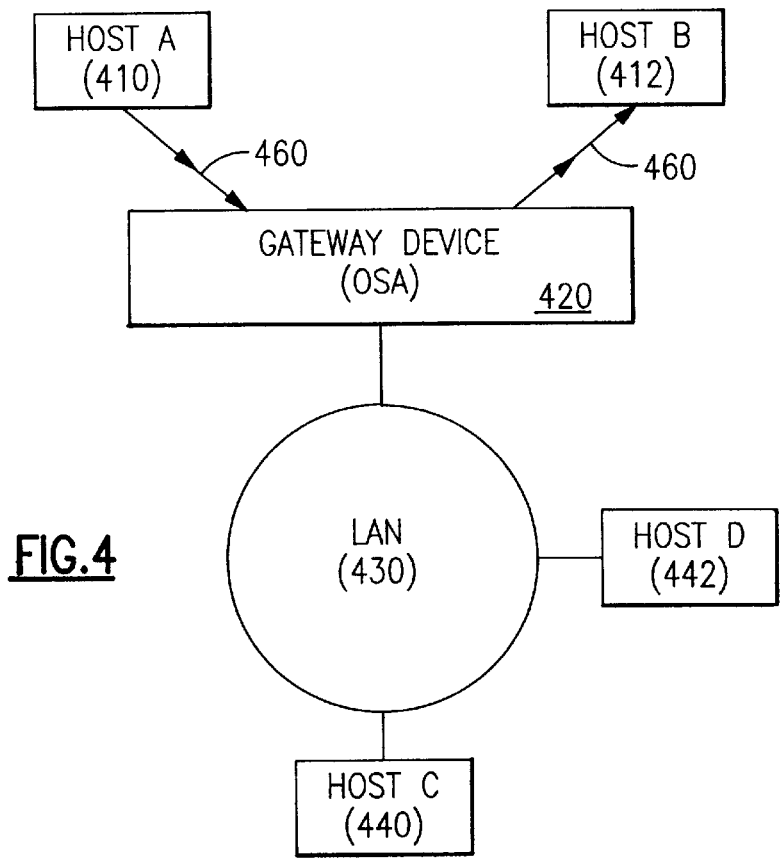
FIG. 4 is another illustration of the block diagram shown in FIG. 2 with arrows indicating the flow of information according to one embodiment of the present invention.

FIG. 2 depicts one embodiment of the present invention. Originating hosts A and B shown at 210 and 212 are connected to a gateway device, preferably an integrated gateway device such as an OSA and shown at 220. The destination hosts C and D shown at 240 and 242 are also connected via the LAN shown at 230 to the gateway device. In the existing systems when originating hosts A and B try to establish communication with destination hosts C and D, the appropriate MAC Header has to be formed first for each communication. Another existing limitation in the present system is that if host A is trying to communicate with host B, the information has to travel from host A into the gateway device and onto the LAN as depicted by the arrows shown in FIG. 3 at 350 before being transformed to Host B. The present invention, however, provides for a technique so that the information from Host A can be provided to Host B without going to the LAN at all as depicted in FIG. 4 and indicated by the arrows shown at 460.

In the present invention whenever each host gets connected to the gateway device, it sends the required address information as an configuration command to the gateway device during an initial handshaking at the onset of establishing communication with the gateway device. It is the gateway device itself that uses the configuration command and controls the communication from that point on. Referring back to FIG. 2, destination hosts C and D continuously are aware of the IP addresses and requirements of the gateway device. Destination hosts C and D obtain the destination MAC addresses of initiating hosts A and B directly from the gateway device, not from Hosts A and B. Hosts A and B have no knowledge of the media specific information or address resolution. Hosts C and D only know about the gateway device address. In other words hosts C and D only know hosts A and B through the gateway device. The same is true about hosts A and B in that they are not aware of independent existence of C and D except through the use of the gateway device. As a consequence, there is no need to define the type of device or the LAN type and protocol versioning each time the communication is being established. In the present invention there are tables existing in the gateway device that are used to make the device aware of all the host/LAN/WAN connections and their special needs. Every time, for example host A is trying to communicate with host C, the gateway device searches in its table of addresses to find the address of A and C so that communication is carried out successfully. But the gateway device is also aware, through the use of its previously stored information of the type of LAN that is connected to device C, any limitations and particular needs that device C has as well as the type of communication protocol needed for device A to communicate with device C. Every time a LAN or host is being newly added, the present invention through an initialization step introduces the device and stores any pertinent information that is needed for further communications. From that point on, once the host becomes connected to the gateway device, the gateway device remains aware of all its requirements. The gateway device also checks the availability and existence of the device connections and their workability, at intervals to monitor and ensure that the device is still available. If the device is no longer in use, the gateway device makes the appropriate alterations to the table(s) in question.

In the existing systems there is a configuration file attached to each communication platform that controls all configuration information. It is the responsibility of the user to keep this configuration file updated. Any new addition or deletion of hosts must be inputted by the user and there is no way that modifications and alterations can be handled automatically. The present invention, however, as explained earlier dynamically and automatically handles alterations, additions and modifications to the configuration through the use of commands explained in detail below and through the use of specially accessed tables.

Figure 5:
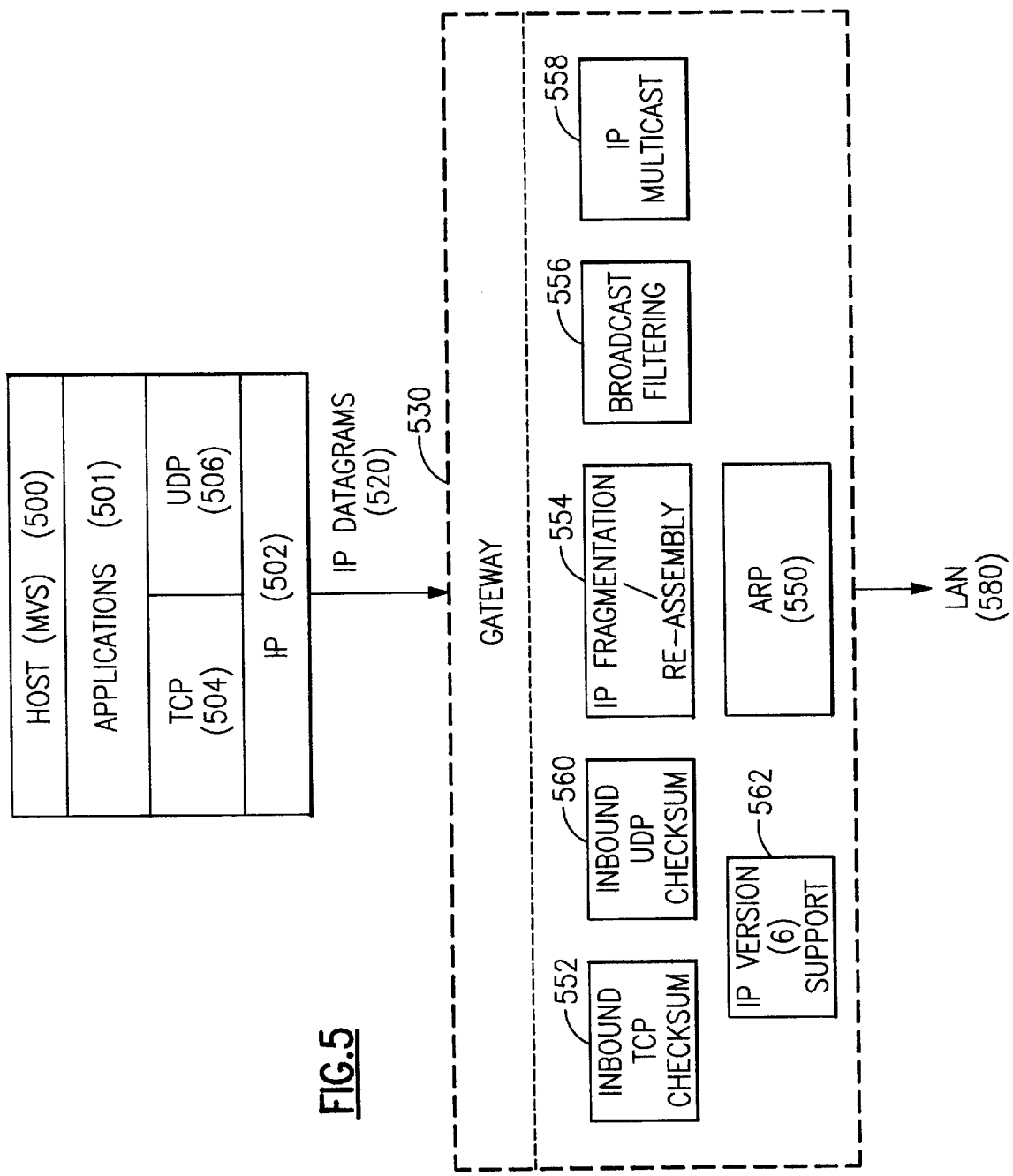
FIG. 5 is yet another block diagram illustration of a computing environment providing different functions as supported by the environment.

FIG. 5 is an illustration of the workings of the present invention as explained by one embodiment. The host and its operating system and applications is shown at 500 and 501 respectively. The IP protocols are shown at 502 (IP) and TCP and UDP at 504 and 506, respectively. The TCP/IP or UDP/IP functions available are shown at 550—ARP, 552—Inbound TCP checksum, 554—IP fragmentation/reassembly, 556—broadcast filtering, 558—IP multicast, 560—Inbound UDP checksum and 562—IP version support (Version 6 is used as way of example). The communication protocol options presented at 550–562 are merely for demonstration purposes and it is possible to add or modify this list according to each particular setup and mechanism. For example in an alternate embodiment of the invention described below, SAP and RIP functions are among the functions that are supported. The LAN connection is shown at 580 and the gateway connection at 530.

In such setups, usually a control command interface exists in the gateway device to allow TCP/IP or other protocols to connect to the gateway device in order to begin data transfers. However, this control command interface requires all the configuration information to be set prior to the TCP/IP connect sequence. Furthermore, the control interface does not have a command sequence to enable the use of the TCP/IP functions which have been implemented in the gateway device. The TCP/IP program product running on such operating systems as MVS and VM/VSE have been developed by a number of companies. But many of today's TCP/IP implementations have encountered performance problems due to the increased bandwidth of the LAN/WAN arenas. To try and improve the MVS and other similar operating system's performance using TCP/IP or other communication protocols, various TCP/IP functions have been identified which could better be implemented in a gateway device which has LAN/WAN connectivity. Some of these functions include ARP assist, TCP and IP checksum calculations, broadcast filtering and IP fragmentation and reassembly. To reduce the complexity of configuring the gateway devices, the present invention introduces an expanded control command interface. This will allow gateway devices to implement most TCP/IP functions and provide means for determining which TCP/IP functions are supported by the gateway device, if any.

The present invention provides for an expanded control command interface to reduce the complexity of gateway device configurations and address the limitations caused by providing a MAC header. A new subset of control commands have been developed which can be used to reduce such configuration complexities. These fall into three basic categories.

The Set IP Address function basically sets up the IP address at STARTUP time, instead of configuration time. In this way each time a TCP/IP session has to be initialized, configuration needs not to be reestablished, therefore reducing the complexity of configuring the device and dynamically configuring the new IP sessions.

Query IP Assist function allows the TCP-UDP/IP to query the channel attached device to determine which TCP-UDP/IP functions are implemented in the device. This will allow the ability to determine which functions if any it wishes to use on the gateway device. So referring back to FIG. 1, all functions shown at 150–162 may not be available. Rather only a subset of 150, 152 and 154 may be available. If the user requires the IP multicast, for example, which is not available the Query IP Assist will allow the user to determine this before further processing time is wasted. Because of its flexibility, the Query IP Assist function can be selected as desired to either work in conjunction with the SET IP Address function or with SET IP Assist function.

The Set IP Assist function will tell the channel attached device which TCP-UDP/IP functions are supported and available to be activated. This allows TCP-UDP/IP to individually select which functions it desires to use. Referring back to FIG. 1, the user may only want to select broadcast filtering for example from the menu of available functions shown at 152–162.

As a consequence, as explained earlier, since the hosts really only know each other through the gateway device, and the gateway device through its port-sharing tables controls and monitors all the configuration information, when Host A wants to communicate with Host B, (FIGS. 2–4), Host A's data does not require to go all the way to the LAN before being transmitted to Host B as in the existing systems. Routing between A and B is direct and without the extra step of involving the LAN. This routing mechanism can be implemented in a loosely coupled environment, such as a Sysplex, for sending any type of data between any two hosts and especially without involving any LAN/WAN connections.

SET IP ADDRESS

The Set IP Address command is used to associate an IP address with a specific user session. The command is initiated by the user. Once the command is received, the gateway device quickly searches its existing port-sharing tables to see if the particular IP address is included or not. If there is a match found, that means that the particular device has been formerly identified. A complete IP data match also indicates that there are no alterations or modifications to be made. However if no matches are found for the IP address, the information concerning the particular IP address, the application using the gateway device from the particular host and the information concerning the port type and subnet mask is obtained from the IP datagram and configuration information and used to build a new entry in the port-sharing table to be used for all future communications. The MTU or maximum transmission Unit size is also determined. The MTU is the maximum data size allowable for processing.

Figure 7A:
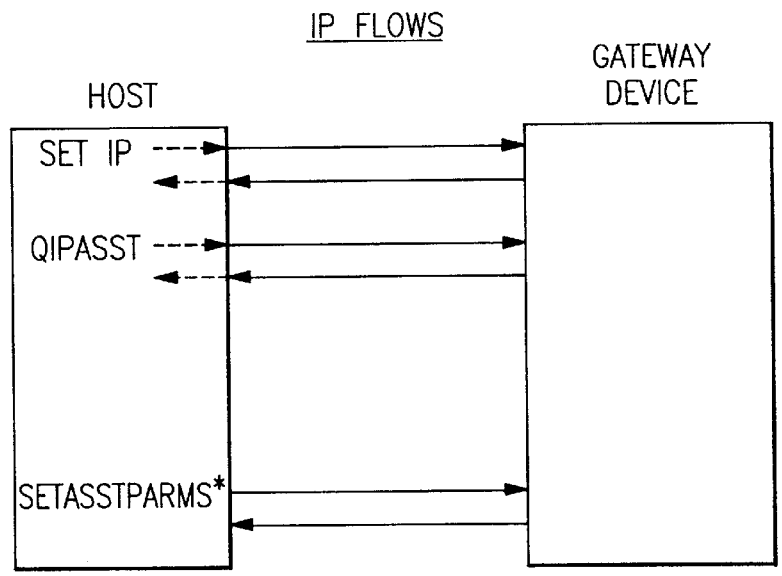
FIGS. 7A and 7B is an illustration of data flow to and from the gateway device.
Figure 7B:
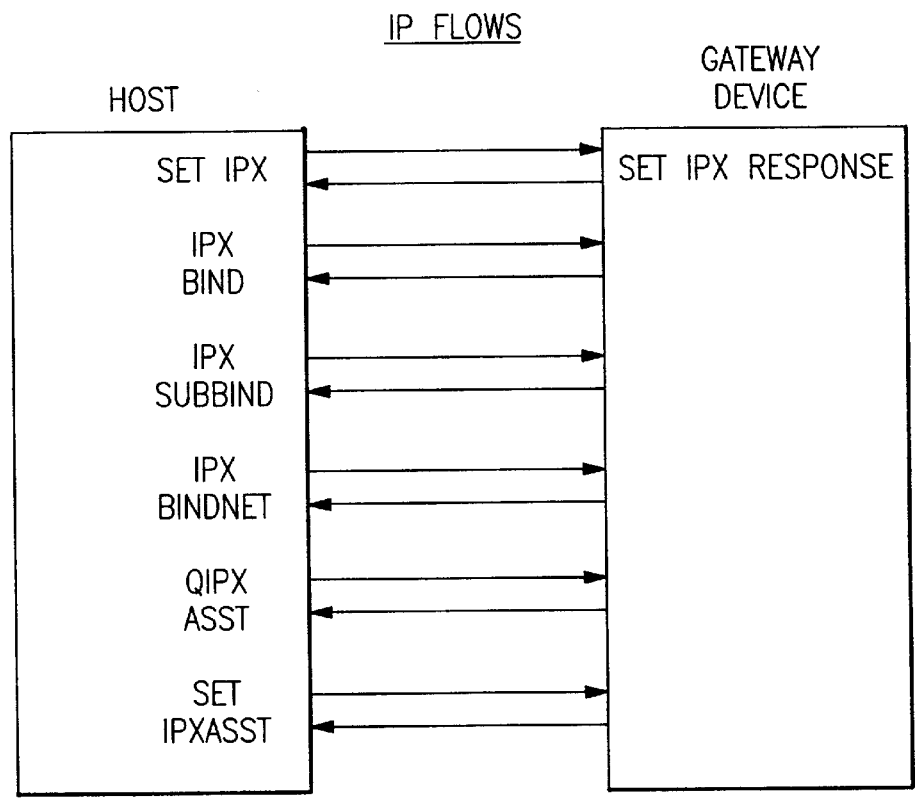

The following tables depicts the information that is obtained from the IP datagram and configuration information, and the information returned to the host and/or established to be used for future communications. FIGS. 7A and 7B show this exchange of information flow to and from the gateway. While FIG. 7A shows this exchange for the following tables represented in this section, FIG. 7B is a similar counterpart showing the flow for the alternate embodiment as described below.

Table 1A is composed of the information obtained at the onset of SETIP Address command and Table 1B comprises of the returned information.

TABLE 1A

SETIP Command Structure

| B1 | 00 | nnnn | 0000 | LT | LN | CNT | 0000 | 0000 | VER | IP Addr | Subnet Mask | MTU |
|----|----|------|------|----|----|-----|------|------|-----|---------|-------------|-----|
| 0  | 1  | 2    | 4    | 6  | 7  | 8   | 10   | 12   | 14  | 16      | --//--      |     |

Where:

nnnn - Sequence Number Field - two byte field containing a S/390 integer sequence counter. Each command initiator maintains its own sequence count, which starts at zero for the first command, and is serially incremented (by one) for each subsequent command. The response string will contain the same sequence number echoed back.

LT- Adapter type code - one byte field indicating the adapter type code.
    1 = Ethernet
    2 = Token Ring
    7 = FDDI LN- Relative adapter number - one byte field indicating the relative adapter number.

VER- 2 byte field - version supported for this command (valid entries are 4 (IP V4) or 6 (IP V6)).

CNT- Count Field - 2 byte field (unsigned integer) contains the number of parameters that are included in the command data field.

IP Addr- IP address of the connection. This is a 4 or 16 byte field depending on the value of the version id. (V4 = 4bytes, V6 = 16bytes).

Netmask - The TCP/IP Netmask of this connection. This is a 4 or 16 byte field depending on the value of the version id. (V4 = 4bytes, V6 = 16bytes).

MTU - The Maximum transmittal unit size (MTU) of this connection. This a 4 byte field stating the max frame size that can be transmitted on this LAN/WAN segment.

TABLE 1B

SETIP Reply Command Structure

| B1 | 00 | nnnn | RC | LT | LN | CNT | ASTS | ASTE | VER | DATA |
|----|----|------|----|----|----|-----|------|------|-----|------|
| 0  | 1  | 2    | 4  | 6  | 7  | 8   | 10   | 12   | 14  | 16  --//-- |

Where:

nnnnn - Sequence Number Field - two byte field containing a S/390 integer sequence counter. Each command initiator maintains its own sequence count, which starts at zero for the first command, and is serially incremented (by one) for each subsequent command. The response string will contain the same sequence number echoed back.

RC - Command return code. 2 byte field indicating the return code status.

TABLE 1B-continued

SETIP Reply Command Structure

RC values:

| Value | Description | CNT# | Data Length (in bytes) |
|---|---|---|---|
| 0x0000 | Success | 0 | 0 |
| 0x0001 | Command Not Supported | 0 | 0 |
| 0xE001 | Data Field Mismatch (V6 type with V4 data field size or vice versa) | 0 | 0 |
| 0xE002 | Invalid MTU Size | 1 | 4 (returns Max MTU size that we can support on this connection) |
| 0xE003 | Invalid LAN Type or LAN Number | 1 | 4 (returns LAN Type and LAN Number) |
| 0xE004 | IP Address table full | 1 | 4 (returns max number of connections we support. Currently MAX = 16) |

| | | |
|---|---|---|
| LT - | Adapter type code - one byte field indicating the adapter type code. 1 = Ethernet 2 = Token Ring 7 = FDDI | |
| LN - | Relative adapter number - one byte field indicating the relative adapter number. | |
| VER - | 2 byte field - version supported for this command (valid entries are 1 (SNA), 4 (IP V4), or 6 (IP V6)). | |
| ASTS - | 16 bit field - TCP/IP Assists supported (information valid only in reply frames). The bit fields are defined as follows (bit on signifies supported) Assist List: Arp Processing- bit 0 (0x0001) Inbound Checksum Support - bit 1 (0x0002) Outbound Checksum Support - bit 2 (0x0004) IP Fragmentation/Reassembly - bit 3 (0x0008) Filtering - bit 4 (0x0010) IP V6 Support - bit 5 (0x0020) | |
| ASTE - | 16 bit field - TCP/IP Assists Enabled (information valid only in reply frames). | |
| CNT - | Count Field - 2 byte field (unsigned integer) contains the number of parameters that are included in the command data field. | |
| DATA - | RC code dependent data. | |

QIPASST—Query IP Assist Function

One of the commands provided by the present invention is a SET IP Assist. The IP Assist command designed for high performance LAN/WAN connections allows the dynamic configuration of IP functions in gateway devices and enables virtual IP addressing. TCP-UDP/IP will use this command to query the channel or integrated platform which TCP-UDP/IP functions on the device are available. This allows TCP-UDP/IP to individually select which functions it desires to use. The SET IP Assist (SETASSTPARMS) function allows TCP/IP to support multiple devices which in turn can support multiple levels of IP Assist functions. TCP/IP can specify different IP functions for each configured IP address with the SET IP ASSIST function. This adds considerable flexibility to TCP/IP. Special IP ASSISTs which are more useful for specific IP addresses configured for Web Serving can specify specific IP ASSISTs which are designed for Web Serving.

FIG. 5 provides some of the functions supported and used by TCP/IP and on the OSA platform. These assist functions include ARP, Inbound Checksum, Outbound Checksum and IP Fragmentation/Reassembly. The IP Assist functions are designed to shorten the Host code path length and improve the performance of TCP/IP. By providing a command which can be used to query the communication adapters, individual IP sessions which run through the adapter can be setup to use the fast path and the other IP sessions can use the normal path. Again a list of the functions available is kept on the port-sharing table and those that become available or unavailable are masked off appropriately. In this way it is easy to determine at once which functions are supported by the system at any one time very efficiently. The following tables highlight the information originally obtained (Table 2A) and information relayed back to the host (Table 2B). Note that the information provided in FIG. 5 highlighting OSA supported functions ARP, Inbound Checksum, Outbound Checksum and IP Fragmentation/Reassembly are only for demonstration purposes. The set of functions can be customized to include more or less elements selectively as applications require.

TABLE 2A

QIPASST Command Structure

| B2 | 00 | nnnn | 0000 | LT | LN | 0000 | 0000 | 0000 | VER |
|----|----|------|------|----|----|------|------|------|-----|
| 0  | 1  | 2    | 4    | 6  | 7  | 8    | 10   | 12   | 14  16 |

Where:
- nnnnn - Sequence Number Field - two byte field containing a S/390 integer sequence counter. Each command initiator maintains its own sequence count, which starts at zero for the first command, and is serially incremented (by one) for each subsequent command. The response string will contain the same sequence number echoed back.
- LT - Adapter type code - one byte field indicating the adapter type code.
  - 1 = Ethernet
  - 2 = Token Ring
  - 7 = FDDI
- LN - Relative adapter number - one byte field indicating the relative adapter number.
- VER - 2 byte field - version supported for this command ( valid entries are 4 (IP V4), or 6 (IP V6)).

TABLE 2B

Figure 7-15 QUERYIP Reply-Command Structure

| B2 | 00 | nnnn | RC | LT | LN | 0000 | ASTS | ASTE | VER |
|----|----|------|----|----|----|------|------|------|-----|
| 0  | 1  | 2    | 4  | 6  | 7  | 8    | 10   | 12   | 14  16 |

Where:
- nnnnn - Sequence Number Field - two byte field containing a S/390 integer sequence counter. Each command initiator maintains its own sequence count, which starts at zero for the first command, and is serially incremented (by one) for each subsequent command. The response string will contain the same sequence number echoed back.
- RC - Command return code. 2 byte field indicating the return code status.
  - RC values:
    - 0x0000 = Success
    - 0x0001 = Command Not Supported
    - 0xE003 = Incorrect LAN Type or Number

TABLE 2B-continued

Figure 7-15 QUERYIP Reply-Command Structure

- LT - Adapter type code - one byte field indicating the adapter type code.
  - 1 = Ethernet
  - 2 = Token Ring
  - 7 = FDDI
- LN - Relative adapter number - one byte field indicating the relative adapter number.
- VER - 2 byte field - version supported for this command (valid entries are 4 (IP V4) or 6 (IP V6)).
- ASTS - 16 bit field - TCP/IP Assists supported (information valid only in reply frames). The bit fields are defined as follows (bit on signifies supported) Assist List:
  - Arp Processing - bit 0 (0x0001)
  - Inbound Checksum Support - bit 1 (0x0002)
  - Outbound Checksum Support - bit 2 (0x0004)
  - IP Fragmentation/Reassembly - bit 3 (0x0008)
  - Filtering - bit 4 (0x0010)
  - IP V6 Support - bit 5 (0x0020)
- ASTE - 16 bit field - TCP/IP Assists Enabled (information valid only in reply frames).

SETASSTPARMS—Set IP Assist (Parameters)

The SETASSTPARMS command is used by the host IP stack and all the IP applications (i.e. TCP/IP, UDP/IP etc.) to enable the particular assists desired and to specify the parameters needed by the particular assists that are being implemented in the channel, integrated or OSA specific platforms. Examples of these parameters is the setting of the size of the ARP Cache, or the protocols that will be filtered if Broadcast Filtering is implemented. When used with an OSA adapter, the OSA adapter will just discard the broadcast packet when it has been received. The IP protocols include RIP (Routing Information Protocol, SNMP (Simple Network Management Protocol) and BGP (Border Gateway Protocol). This command allows the user not only to query about the functions that are available but to selectively pick and choose these functions. Tables 3A and 3B are representative of the information obtained and information returned respectively. Tables 3C and 3D represent some of the commands available and the responses returned.

TABLE 3A

Figure 7-16 SETASSTPARMS Command Structure

| B3 | 00 | nnnn | 0000 | LT | LN | 0000 | 0000 | 0000 | VER | Assist Number | Assist Options | Assist Parms |
|----|----|------|------|----|----|------|------|------|-----|---------------|----------------|--------------|
| 0  | 1  | 2    | 4    | 6  | 7  | 8    | 10   | 12   | 14  | 16            | --//--         |              |

Where:
- nnnnn - Sequence Number Field - two byte field containing a S/390 integer sequence counter. Each command initiator maintains its own sequence count, which starts at zero for the first command, and is serially incremented (by one) for each subsequent command. The response string will contain the same sequence number echoed back.
- LT - Adapter type code - one byte field indicating the adapter type code.
  - 1 = Ethernet
  - 2 = Token Ring
  - 7 = FDDI
- LN - Relative adapter number - one byte field indicating the relative adapter number.
- VER - 2 byte field - version supported for this command (valid entries are 4 (IP V4) or 6 (IP V6)).

TABLE 3A-continued

Figure 7-16 SETASSTPARMS Command Structure

Assist Number -

| Number | Description |
|---|---|
| 0x0001 | ARP Assist |
| 0x0002 | Inbound CheckSum Support |
| 0x0004 | OutBound CheckSum Support |
| 0x0008 | IP Frag/Reassemble |
| 0x0010 | Frame Filtering |
| 0x0020 | IP V6 Support |

Assist Options - Assist Specific - refer to table below
Assist Parameters - Assist Specific - refer to table below

TABLE 3B

SETASSTPARMS Reply Command Structure

| B3 | 00 | nnnn | RC | LT | LN | 0000 | ASTS | ASTE | VER | ASN | ASO | RC | Data |
|---|---|---|---|---|---|---|---|---|---|---|---|---|---|
| 0 | 1 | 2 | 4 | 6 | 7 | 8 | 10 | 12 | 14 | 16 | 18 | 20 | 24 |

Where:

- nnnnn - Sequence Number Field - two byte field containing a S/390 integer sequence counter. Each command initiator maintains its own sequence count, which starts at zero for the first command, and is serially incremented (by one) for each subsequent command. The response string will contain the same sequence nurnber echoed back.
- RC - Command return code. 2 byte field indicating the return code status.
  RC values:
    0x0000 = Success
    0x0001 = Command Not Supported
    0xE003 = Incorrect LAN Type or Number
- LT - Adapter type code - one byte field indicating the adapter type code.
    1 = Ethernet
    2 = Token Ring
    7 = FDDI
- LN - Relative adapter number - one byte field indicating the relative adapter number.
- VER - 2 byte field - version supported for this command ( valid entries are 4 (IP V4) or 6 (IP V6)).
- ASTS - 16 bit field - TCP/IP Assists supported (information valid only in reply frames). The bit fields are defined as follows (bit on signifies supported) Assist List:
    Arp Processing -                bit 0 (0x0001)
    Inbound Checksum Support -      bit 1 (0x0002)
    Outbound Checksum Support -     bit 2 (0x0004)
    IP Fragmentation/Reassembly -   bit 3 (0x0008)
    Filtering -                     bit 4 (0x0010)
    IP V6 Support - -               bit 5 (0x0020)
- ASTE - 16 bit field - TCP/IP Assists Enabled (information valid only in reply frames).
- ASN - 2 byte field - Assist Number
- ASO - 2 byte field - Assist Option
- RC- 4 byte field - Return Code -
    0x00000000 - Success
    Anything else - command specific failure
- Data - Assist specific data

TABLE 3C

| Assist Number | Assist Command | Assist Command Description | Assist Command Parameters |
|---|---|---|---|
| ARP (0 x 0001) | 0 x 0001 | Start Assist | None |
| | 0 x 0002 | Stop Assist | None |
| | 0 x 0003 | Set Numbers of ARP Cache Entries (Default = 256) | 4 byte field = number of entries |
| | 0 x 0004 | Query ARP Cache Table - returns all entries in ARP Cache | None |

TABLE 3C-continued

| Assist Number | Assist Command | Assist Command Description | Assist Command Parameters |
|---|---|---|---|
| | 0 × 0005 | Add ARP Cache Entry | 4 or 16 field = IP address of entry you want to add |
| | 0 × 0006 | Remove ARP Cache Entry | 4 or 16 byte field = IP address of entry you want to remove |
| | 0 × 0007 | Flush ARP Table - all ARP Cache Entries are deleted | None |
| Inbound | 0 × 0001 | Start Assist | None |
| CheckSum | 0 × 0002 | Stop Assist | None |
| Support (0 × 0002) | 0 × 0003 | Enable Checksum Frame Types (Bit on enables feature)<br>Bit 0 - Enable IP Frame CheckSumming<br>Bit 1 -Enable ICMP Frame CheckSumming<br>Bit 2 - Enable UDP Frame CheckSumming<br>Bit 3 - Enable TCP Frame CheckSumming<br>Bits 4–31 - reserved (set to zero) | None |
| OutBound | 0 × 0001 | Start Assist | None |
| CheckSum | 0 × 0002 | Stop Assist | None |
| Support (0 × 0004) | 0 × 0003 | Enable Checksum Frame Types (Bit on enables feature)<br>Bit 0 - Enable IP Frame CheckSumming<br>Bit 1 - Enable ICMP Frame CheckSumming<br>Bit 2 - Enable UDP Frame CheckSumming<br>Bit 3 - Enable TCP Frame CheckSumming<br>Bits 4–31 - reserved (set to zero) | None |
| IP Frag/ | 0 × 0001 | Start Assist | None |
| Reassmble Support (0 × 0008) | 0 × 0002 | Stop Assist | None |
| Filtering | 0 × 0001 | Start Assist | None |
| Support | 0 × 0002 | Stop Assist | None |
| (0 × 0010) | 0 × 0003 | What Frames to Filter (32 Bit field)<br>(Turn bit on to enable filtering)<br>Bit 0 - ARP Frames (This bit is turned on automatically<br>    if the ARP Assist is enabled)<br>Bit 1 - RARP Frames<br>Bit 2 - ICMP Frames<br>Bit 3 - IP Frames<br>Bit 4 - IPX/SPX Frames<br>Bit 5 - RIP Frames<br>Bit 6 - BGP Frames<br>Bit 7 - UDP Frames<br>Bit 8 - TCP Frames<br>Bit 9 - SNMP Frames<br>Bit 10 - Multicast Frames<br>Bit 11 - BroadCast Frames<br>Bit 12–31 - Reserved | None |
| IP V6 | 0 × 0001 | Start Assist | None |
| Support | 0 × 0002 | Stop Assist | None |
| (0 × 0020) | 0 × 0003 | What Functions to Support (32 Bit field)<br>(Turn bit on to enable)<br>Bit 0 - Allow V6 Traffic<br>Bit 1 - Allow V4 Traffic<br>Bit 2 - Translate V4 to V6 Model<br>Bit 3 - Translate V6 to V4 Model<br>Bit 4–31 Reserved | None |

TABLE 3D

SETASSTPARMS Reply Command Options

| Assist Number | Assist Command | Assist Command Description | Assist Data (Reply) - (least significant 2 bytes) |
|---|---|---|---|
| ARP (0 × 0001) | 0 × 0001 | Start Assist | RC - 0 × 0000 - Success<br>    0 × 0001 - Failed<br>    0 × 0002 - Not Supported<br>Data-None |
| | 0 × 0002 | Stop Assist | RC - 0 × 0000 - Success<br>    0 × 0001 - Failed<br>    0 × 0002 - Not Supported<br>Data- None |
| | 0 × 0003 | Set Number of ARP Cache Entries (Default = 256) | RC - 0 × 0000 - Success<br>    0 × 0001 - Failed<br>    0 × 0002 - Not Supported<br>    0 × 0003 - Out of Range |

TABLE 3D-continued

SETASSTPARMS Reply Command Options

| Assist Number | Assist Command | Assist Command Description | Assist Data (Reply) - (least significant 2 bytes) |
|---|---|---|---|
| | 0 × 0004 | Query ARP Cache Table - returns all entries in ARP Cache | Data-if RC = 0 × 0003 return 4 bytes - max number of entries supported<br>RC - 0 × 0000 - Success<br>0 × 0001 - Failed<br>0 × 0002 - Not Supported<br>Data-in non failing RC - returns ARP Cache Table |
| | 0 × 0005 | Add ARP Cache Entry | RC - 0 × 0000 - Success<br>0 × 0001 - Failed<br>0 × 0002 - Not Supported<br>Data-returns ARP Cache Entry |
| | 0 × 0006 | Remove ARP Cache Entry | RC - 0 × 0000 - Success<br>0 × 0001 - Failed<br>0 × 0002 - Not Supported<br>Data-returns ARP Cache Entry |
| | 0 × 0007 | Flush ARP Table - all ARP Cache Entries are deleted | RC - 0 × 0000 - Success<br>0 × 0001 - Failed<br>0 × 0002 - Not Supported<br>Data-None |
| Inbound CheckSum Support (0 × 0002) | 0 × 0001 | Start Assist | RC - 0 × 0000 - Success<br>0 × 0001 - Failed<br>0 × 0002 - Not Supported<br>Data-None |
| | 0 × 0002 | Stop Assist | RC - 0 × 0000 - Success<br>0 × 0001 - Failed<br>0 × 0002 - Not Supported<br>Data-None |
| | 0 × 0003 | Enable Checksum Frame Types (Bit on enables feature)<br>Bit 0 - Enable IP Frame CheckSumming<br>Bit 1 - Enable ICMP Frame CheckSumming<br>Bit 2 - Enable UDP Frame CheckSumming<br>Bit 3 - Enable TCP Frame CheckSumming<br>Bits 4–31 - reserved (set to zero) | RC - 0 × 0000 - Success<br>0 × 0001 - Failed<br>0 × 0002 - Not Supported<br>Data-4 bytes with least 4 significant bits representing what Checksumming support is available |
| OutBound CheckSum Support (0 × 0004) | 0 × 0001 | Start Assist | RC - 0 × 0000 - Success<br>0 × 0001 - Failed<br>0 × 0002 - Not Supported<br>Data-None |
| | 0 × 0002 | Stop Assist | RC - 0 × 0000 - Success<br>0 × 0001 - Failed<br>0 × 0002 - Not Supported<br>Data-None |
| | 0 × 0003 | Enable Checksum Frame Types (Bit on enables feature)<br>Bit 0 - Enable IP Frame CheckSumming<br>Bit 1 - Enable ICMP Frame CheckSumming<br>Bit 2 - Enable UDP Frame CheckSumming<br>Bit 3 - Enable TCP Frame CheckSumming<br>Bits 4–31 - reserved (set to zero) | RC - 0 × 0000 - Success<br>0 × 0001 - Failed<br>0 × 0002 - Not Supported<br>Data-4 bytes with least 4 significant bits representing what Checksumming support is available |
| IP Frag/ Reassmble Support (0 × 0008) | 0 × 0001 | Start Assist | RC - 0 × 0000 - Success<br>0 × 0001 - Failed<br>0 × 0002 - Not Supported<br>Data-None |
| | 0 × 0002 | Stop Assist | RC - 0 × 0000 - Success<br>0 × 0001 - Failed<br>0 × 0002 - Not Supported<br>Data-None |
| Filtering Support (0 × 0010) | 0 × 0001 | Start Assist | RC - 0 × 0000 - Success<br>0 × 0001 - Failed<br>0 × 0002 - Not Supported<br>Data-None |
| | 0 × 0002 | Stop Assist | RC - 0 × 0000 - Success<br>0 × 0001 - Failed<br>0 × 0002 - Not Supported<br>Data-None |
| | 0 × 0003 | What Frames to Filter (32 Bit field)<br>(Turn bit on to enable filtering)<br>Bit 0 - ARP Frames (This bit is truned on automatically if the ARP Assist is enabled)<br>Bit 1 - RARP Frames<br>Bit 2 - ICMP Frames<br>Bit 3 - IP Frames<br>Bit 4 - IPX/SPX Frames | RC - 0 × 0000 - Success<br>0 × 0001 - Failed<br>0 × 0002 - Not Supported<br>Data-4 bytes with least 12 significant bits representing what Filtering support is available |

TABLE 3D-continued

SETASSTPARMS Reply Command Options

| Assist Number | Assist Command | Assist Command Description | Assist Data (Reply) - (least significant 2 bytes) |
|---|---|---|---|
| | | Bit 5 - RIP Frames | |
| | | Bit 6 - BGP Frames | |
| | | Bit 7 - UDP Frames | |
| | | Bit 8 - TCP Frames | |
| | | Bit 9 - SNMP Frames | |
| | | Bit 10 - Multicast Frames | |
| | | Bit 11 - BroadCast Frames | |
| | | Bit 12–31 - Reserved | |
| IP V6 Support (0 × 0020) | 0 × 0001 | Start Assist | RC - 0 × 0000 - Success<br>0 × 0001 - Failed<br>0 × 0002 - Not Supported<br>Data-None |
| | 0 × 0002 | Stop Assist | RC - 0 × 0000 - Success<br>0 × 0001 - Failed<br>0 × 0002 - Not Supported<br>Data-None |
| | 0 × 0003 | What Functions to Support (32 Bit field)<br>(Turn bit on to enable)<br>Bit 0 - Allow V6 Traffic<br>Bit 1 - Allow V4 Traffic<br>Bit 2 - Translate V4 to V6 Model<br>Bit 3 - Translate V6 to V4 Model<br>Bit 4–31 Reserved | RC - 0 × 0000 - Success<br>0 × 0001 - Failed<br>0 × 0002 - Not Supported<br>Data-4 bytes with least 4 significant bits representing what function support is available |

MULTI-PATH CHANNELS—An Alternate Embodiment

MPC or multi-path channel protocol is a highly efficient data transfer interface developed to replace LCS by IBM Corp. of Armonk, N.Y. MPC can be implemented in the TCP/IP or VTAM layer; it can also be implemented using Novell based systems. In the existing systems when Host A wants to send data to the gateway or another host, it will wait and collect all information that has to be sent in preselected sizes. This waiting and grouping of data is called "blocking". On the receiving side, this blocked data has to be "deblocked" to distinguish between the individual commands or data.

The existing LCS protocol provides an efficient method of transferring data across the I/O subsystem by blocking multiple LAN frames together in one long chain. However, to provide this interface the LCS protocol is required to use the host processor to copy all the LAN Media Headers and all the application data into one contiguous block before performing the data transfer across the I/O subsystem. Also the LCS must prepend each LAN frame in the block with a four byte LCS header. This header is needed by the "deblocker" application running on the channel attached platform. The "deblocker" application uses the header to remove the individual LAN frames from the LCS block and send them to the LAN. This makes very inefficient use of the host's memory and creates extra latency for the user data. The current LCS interface also requires the device drivers to build the LAN Media Headers. The data passed to LCS must be in the exact format of the data which is to be transferred to the LAN. This requires all applications using the LAN interface to know which LAN type the data is being transferred to along with the destination LAN MAC addresses. One unique device driver must be written for each LAN type to which the application is connected.

The MPC protocol uses a new type of "blocked" data stream known as Discontiguous Protocol Data Units or DPDUs. This new data stream interface allows the header or control information to be in a separate memory area from the user data as it is transferred to the I/O subsystem. This eliminates the need to copy all the LAN media Headers and the application data into one contiguous area. For VTAM applications, a Macro interface has been provided to use when sending data across the MPC connection. The interface allows the application to specify a buffer list. Each entry in the buffer list corresponds to one portion of the discontiguous user data. MPC uses Protocol Data Unit or PDU headers to point at the various portions of the discontiguous user data. Each PDU will contain a list of the PDU elements. Each PDU element will point to one of the entries in the buffer list.

To address the special needs arising from the new MPC protocol manner of handling data streams, an alternate embodiment of the present invention is required and presented here. The three command concepts explained earlier, namely SET IP Address, Query IP and Set IP Assist (parameters) are adjusted to function with the MPC's new requirement. The result is complementary functions SET IPX Address, Query IPX and SETASSTPARMS IPX.

Similar to SET IP Address command, the Set IPX Address command (used primarily but not exclusively with Novell's IPX communication protocol) also to associate an IP address with a specific user session. The command is initiated by the user. Once the command is received, the gateway device quickly searches its existing port-sharing tables to see if the particular IP address is included or not, and alterations, additions or modifications are made if an exact match is not found. However, in the SET IPX Address scenario the only information provided to the gateway device is the LAN port number and id. All other information including a MAC address (as one is necessary in this scenario), MTU size and even the LAN type is provided by the gateway device itself from the port-sharing tables. The following tables provide the specifics of the exchange of information between the host and the gateway device. Notice that all necessary headers including a MAC Header is either dissected or returned by the gateway device as required. Table X1 A and X1 B below shows the IPX command requirements and returned information.

TABLE X1 A

SETIPX Command Format

| C1 | 00 | nnnn | 00 | 00 | LN | 0000 | 0000 | 0000 | 0000 | MTU |
|----|----|------|----|----|----|------|------|------|------|-----|
| 0  | 1  | 2    | 4  | 6  | 7  | 8    | 10   | 12   | 14   | 16  |

Where:
- C1     SETIPX command
- nnn    Sequence Number filed
- LN     LAN Number to be used by IPX on the OSA Adapter
- MTU   IPX Maximum Transmission Unit for this connection. This is a four byte field stating the maximum frame size which can be transmitted on this LAN/WAN segment. A value of 0xFFFFFFFF implies the MTU value used will be the returned by OSA on the SETIPX response shown below.

Where:

C1 SETIPX command nnnn Sequence Number filed

LN LAN Number to be used by IPX on the OSA Adapter

MTU IPX Maximum Transmission Unit for this connection. This is a four byte field stating the maximum frame size which can be transmitted on this LAN/WAN segment. A value of 0xFFFFFFFF implies the MTU value used will be the returned by OSA on the SETIPX response shown below.

TABLE X1 B

The OSA Command Response Format is as follows:

| C1 | 00 | nnnn | RC | LT | LN | 0000 | 0000 | 0000 | 0000 |
|----|----|------|----|----|----|------|------|------|------|
| 0  | 1  | 2    | 4  | 6  | 7  | 8    | 10   | 12   | 14   |

| MAC | 0000 | MTU |
|-----|------|-----|
| 16  | 22   | 24     28 |

Where:
- nnn    Sequence number matching the SETIPX request
- RC     Return code (Status) from OSA Adapter
- LT      LAN Type associated with the LAN Port selected on the SETIPX request
- LN     LAN Number which was specified with the SETIPX request
- MAC   MAC Address of OSA LAN Port
- MTU   Supported MTU value on the OSA adapter Where:

nnnn Sequence number matching the SETIPX request

RC Return code (Status) from OSA Adapter

LT LAN Type associated with the LAN Port selected on the SETIPX request

LN LAN Number which was specified with the SETIPX request

MAC MAC Address of OSA LAN Port

MTU Supported MTU value on the OSA adapter

Tables X1 C and X1 D below reflect two new subcommand functions the IPX Bind and UNBIND. Binding is a function that allows the supporting of different LAN types on one computing network environment. The Bind function allows the association of particular LAN frame types to a gateway or the physical port. Unbind function is used when a host IPX connection terminates or is shutdown. The Bind command allows one Novell IPX device driver running on the host to support multiple LAN types along with multiple frame types within a specific LAN type. Prior to this implementation, one device driver was necessary for each LAN type and each frame type within a specific LAN type. For example, one device driver can now support an Ethernet-SNAP and Ethernet-802.2 frame type.

IPXBIND

The IPX BIND command is used to BIND a Frame Type to the OSA LAN Port.

The Command Format is as follows:

TABLE X1 C

| C2 | 00 | nnnn | 00 | LT | LN | 0000 | 0000 | 0000 | 0000 | SAP |
|----|----|------|----|----|----|------|------|------|------|-----|
| 0  | 1  | 2    | 4  | 6  | 7  | 8    | 10   | 12   | 14   | 16  |

Where:
- C2     IPX BIND command
- nnnn   Sequence Number filed
- LT      LAN Type of port
- LN     LAN Number
- SAP    Novell's Service Advertising Protocol. This protocol is used by a Client machine to determine what servers are available on the Network.

Where:

C2 IPX BIND command nnnn Sequence Number filed

LT LAN Type of port

LN LAN Number

SAP Novell's Service Advertising Protocol. This protocol is used by a Client machine to determine what servers are available on the Network.

IPXUNBIND

TABLE X1 D

| C3 | 00 | nnnn | RC | LT | LN | 0000 | 0000 | 0000 | 0000 | SAP |
|----|----|------|----|----|----|------|------|------|------|-----|
| 0  | 1  | 2    | 4  | 6  | 7  | 8    | 10   | 12   | 14   | 16  |

Where:

C3 IPX UNBIND Command nnnn Sequence Number filed

RC Return Code returned from OSA

LT LAN Type of port

LN LAN Number

Subsequent Bind and Unbind commands as reflected in tables X1 E and X1 F below are also used to add even additional information, for example additional SAP parameters. These functions are used in a manner similar to the original bind and unbind function.

IPXSUBBIND

The IPX Subsequent BIND command is used to specify additional SAP information to the OSA adapter. The Subsequent BIND command may or may not immediately follow the IPX BIND command. Once the Subsequent BIND command has been processed, IPX RIP and SAP frames will be forwarded to the operating system (MVS).

The format of the IPX Subsequent BIND command is as follows:

TABLE X1 E

| C3 | 00 | nnnn | RC | LT | LN | 0000 | 0000 | 0000 | 0000 | More SAP |
|----|----|------|----|----|----|------|------|------|------|----------|
| 0  | 1  | 2    | 4  | 6  | 7  | 8    | 10   | 12   | 14   | 16       |

Where:
| C4 | IPX Subsequent Bind Command |
| nnnn | Sequence Number filed |
| RC | Return Code returned from OSA |
| LT | LAN Type of port |
| LN | LAN Number |
| More SAP | More SAP information |

Where:

C4 IPX Subsequent Bind Command nnnn Sequence Number filed

RC Return Code returned from OSA

LT LAN Type of port

LN LAN Number

More SAP More SAP information

IPXSUBUNBIND

TABLE X1 F

| C5 | 00 | nnnn | RC | LT | LN | CNT | 0000 | 0000 | 0000 | Other |
|----|----|------|----|----|----|-----|------|------|------|-------|
| 0  | 1  | 2    | 4  | 6  | 7  | 8   | 10   | 12   | 14   | 16    |

Where:
| C5 | IPX Subsequent UNBIND Network Command |
| nnnn | Sequence Number filed |
| RC | Return Code returned from OSA |
| LT | LAN Type of port |
| LN | LAN Number |

IPX Bind net command (table X1 G) reflects a command used to pass network numbers associated with the operating system to the communication platform. Once a Network Number is specified, then all IPX traffic will be allowed to flow through the IPX connection. The network number will be used to route all non-RIP and non-SAP frames to the proper IPX connection. (RIP and SAP being two functions that are supported in this embodiment.)

FIG. 7B shows the flow of data back and forth from the gateway device for the functions described. Below, Table X1 G shows an example of this for MVS operating system and OSA platform. IPX Unbind net, shown at table X1 H, below is similar to other unbind commands.

IPXBINDNET

The IPX BIND Network Command is used to pass the IPX Network Numbers associated with the MVS Netware Stack to the OSA adapter. Once this command has been processed all IPX frames can be forwarded to the MVS IPX Stack(s).

The format of the IPX BIND Network command is as follows:

TABLE X1 G

| C6 | 00 | nnnn | RC | LT | LN | CNT | 0000 | 0000 | 0000 | NN(s) |
|----|----|------|----|----|----|-----|------|------|------|-------|
| 0  | 1  | 2    | 4  | 6  | 7  | 8   | 10   | 12   | 14   | 16    |

Where:
| C6 | IPX BIND Network Command |
| nnnn | Sequence Number filed |

TABLE X1 G-continued

| RC | Return Code returned from OSA |
| LT | LAN Type of port |
| LN | LAN Number |
| CNT | The count of Network numbers in the Data field |
| NN | IPX Network Number(s). Each Network Number is 4 bytes is length. The CNT field indicates the number of Network Numbers present in this field. |

IPXUNBINDNET

TABLE X1 H

| C7 | 00 | nnnn | RC | LT | LN | 0000 | 0000 | 0000 | 0000 | Other |
|----|----|------|----|----|----|------|------|------|------|-------|
| 0  | 1  | 2    | 4  | 6  | 7  | 8    | 10   | 12   | 14   | 16    |

Where:
| C7 | IPX UNBIND Network Command |
| nnnn | Sequence Number filed |
| RC | Return Code returned from OSA |
| LT | LAN Type of port |
| LN | LAN Number |

The SET IPX Assist function is also similar to the IP Assist command functions in that they are both designed for high performance LAN/WAN connections and allow the dynamic configuration of IPX address in gateway devices. As stated before MPC works both with the TCP/IP and other communications protocol including NetBios as well as the Novel protocol stacks and drivers. As a consequence the number of functions available for the user is more involved. However, again through the pre-established port-sharing tables, it is determined and known to the gateway device as which functions are supported by the device. The set of functions are different in this section and RIP and SAP functions are added to the list of functions available, while other functions specified before with the exception of broadcast filtering may not be available.

Table X2 is reflective of this.

FIG. X2-QIPXASST -Request and Reply Command Format

Request Format

| CA | 00 | nnnnn | 0000 | LT | LN | 0000 | 0000 | 0000 | VER |
|----|----|-------|------|----|----|------|------|------|-----|
| 0  | 1  | 2     | 4    | 6  | 7  | 8    | 10   | 12   | 14 16 |

Reply Format

| CA | 00 | nnnnn | RC | LT | LN | 0000 | ASTS | ASTE | VER |
|----|----|-------|----|----|----|------|------|------|-----|
| 0  | 1  | 2     | 4  | 6  | 7  | 8    | 10   | 12   | 14 16 |

Where:
| nnnnn - | Sequence Number Field - two byte field containing a S/390 Integer Sequence |
| LT- | Adapter type code - one byte field indicating the adapter type code. |
| | 1 = Ethernet/Fast Ethernet |
| | 2 = Token Ring |
| | 7 = FDDI |

FIG. X2-QIPXASST -Request and Reply Command Format

| | |
|---|---|
| LN- | Relative adapter number - one byte field indicating the relative adapter number. |
| VER - | 2 byte field - IPX Version Supported. |
| RC- | Command return code. 2 byte field indicating the return code status.<br>RC values:<br>    0x0000=Success<br>    0x0001=Command Not Supported<br>    0xE003=Incorrect LAN Type or Number |
| ASTS- | 16 bit field - IPX Assists supported (information valid only in reply frames). The bit fields are defined as follows (bit on signifies supported)<br>Assist List:<br>  RIP Assist-                   bit 0 (0x0001)<br>  SAP Assist-                 bit 1 (0x0002)<br>  Frame Filtering-          bit 2 (0x0004)<br>  Host to Host Routing Setup  bit 3 (0x0008)<br>  Extended IPX Version Support  bit 4 (0x0010) |
| ASTE- | (Bits 5–15 are reserved for future use)<br>16 bit field - IPX Assists Enabled (information valid only in reply frames). |

The SETASSTPARMS IPX command is used in a similar manner to its IP counterpart. It is designed to allow the user to select among the appropriately available functions. As before, this command allows the user not only to query about the functions that are available but to selectively pick and choose these functions. Tables X3 is representative of the information obtained and information returned respectively.

FIG. X3-SETIPXASSTPARMS Reply and Request Command Format

Request Format

| CB | 00 | nnnnn | 0000 | LT | LN | 0000 | 0000 | 0000 | VER | Assist Number | Assist Options | Assist Parms |
|---|---|---|---|---|---|---|---|---|---|---|---|---|
| 0 | 1 | 2 | 4 | 6 | 7 | 8 | 10 | 12 | 14 | 16 | | --//-- |

Reply Format

| CB | 00 | nnnnn | RC | LT | LN | 0000 | ASTS | ASTE | VER | ASN | ASO | RC | Data |
|---|---|---|---|---|---|---|---|---|---|---|---|---|---|
| 0 | 1 | 2 | 4 | 6 | 7 | 8 | 10 | 12 | 14 | 16 | 18 | 20 | 24 |

Where:

| | |
|---|---|
| nnnnn - | Sequence Number Field - two byte field containing a S/390 Integer Sequence |
| LT- | Adapter type code - one byte field indicating the adapter type code.<br>    1 = Ethernet/Fast Ethernet<br>    2 = Token Ring<br>    7 = FDDI |
| LN- | Relative adapter number - one byte field indicating the relative adapter number. |
| VER- | 2 byte field - IPX/SPX Version supported. |

Assists Supported (ASTS) - Assist Enabled (ASTE) - 16bit Fields

| Number | Description |
|---|---|
| 0x0001 (Bit 0) | RIP Assist |
| 0x0002 (Bit 1) | SAP Assist |
| 0x0004 (Bit 2) | Frame Filtering |
| 0x0008 (Bit 3) | Host to Host Routing Setup |
| 0x0010 (Bit 4) | Extended IPX Version Support |
| Bits 5–15 | Reserved |

Assist Options - Assist Specific
Assist Parameters - Assist Specific
ASN -    2 byte field - Assist Number
ASO -    2 byte field - Assist Option -continued FIG. X3-SETIPXASSTPARMS Reply and Request Command Format

| | |
|---|---|
| RC - | Command return code. 2 byte field indicating the return code status<br>0x0000=Success<br>0x0001=Command Not Supported<br>0xE003=Incorrect LAN Type or Number |
| Data - | Assist specific data |

In closing of this section, it should be noted that the new routing mechanism suggested by the teachings of the present invention is workable for the MPC protocol as well. Again, through the port-sharing tables it is possible to route messages directly from Host A to Host B without having to access the LAN. It is as before the gateway device that controls and monitors the configurations of the host devices. As before, this routing mechanism can be implemented in a loosely coupled environment, such as a Sysplex, for sending any type of data between any two hosts and especially without involving any LAN/WAN connections.

Blocking IP Datagrams in an MPC Point-To-Point Environment

Figure 6:
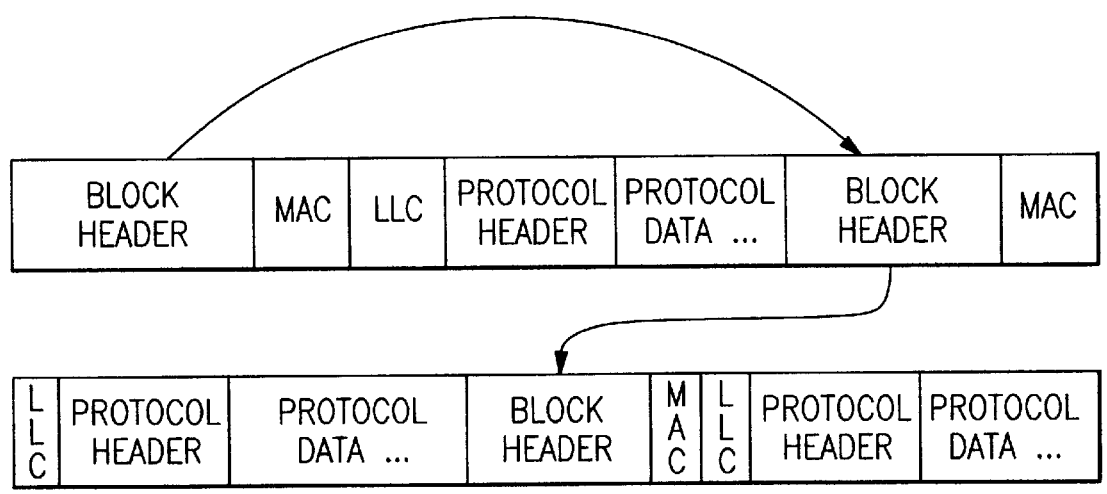
FIG. 6 is an illustration of blocks of data grouped together.

FIG. 6 shows the blocking of data in the existing systems. Block Header 610 shows the start of a new data batch. Each block header 610 is usually followed by the appropriate MAC Header and LLC shown at 612 and 614. The Protocol header and the Protocol data follow as shown in 616 and 618. A new block of data is shown at 620 and 630. Usually the applications receive user data which is to be sent to the LAN in a data buffer. The applications send the user data to the protocol layer. Using MPC, the protocol layers device drivers can now build the LAN Media headers in a separate buffer area and pass a buffer list to the MPC Macro interface. MPC will then build one PDU with two PDU elements to represent the LAN frame. This design, however, also creates some inefficiencies. First, each PDU header built by the VTAM or similar protocols is lengthy, usually having a length of 28 bytes plus the PDU element headers are each 8 bytes in length, normally. This translates into a confined, usually 44 (28+8+8) header being built for each LAN frame being sent by the application. This is compared to the 4 byte LCS header associated with each LAN frame. Second, the protocol stacks must still build the LAN Media headers and be knowledgeable of the LAN Media to which the data is being transmitted. One unique Device Driver must be written on the Host to support each unique LAN type. LCS has the same requirement. Building the LAN Media headers requires the allocation of a special buffer and the moving of the LAN specific data into this buffer. MPC must also build a separate PDU element for the headers.

The present invention also teaches an interface layer composed of software to be placed between the protocol stacks and MPC. This layer has a timer to wait for data from the protocol stacks. As data buffers are received, a buffer list is assembled. The buffer list contains one entry for each data buffer received. After the timer expires, the buffer list is then transferred to the MPC layer. The MPC layer then places the entire buffer list which contains multiple data buffers from a protocol in one PDU. The data will be transmitted across the I/O Subsystem in one CCW chain, arriving at the channel attached processor as one "block".

Since the data contained inside the one "block" received from MPC code contains application data from a protocol stack, the protocol headers contain the length of each data element. The "deblocker" code running on the channel attached processor uses the length fields in the protocol headers to determine the offset of the next data element in the block. This eliminates the need for a special header to point at the next data element which is used by the LCS protocol.

The blocking of multiple protocol data elements in one PDU also improves the efficiency of the data transfer. In this case, only one PDU header needs to be processed for one group of "n" protocol data elements. Previously, one PDU header needed to be processed for each protocol data element.

To further improve the efficiency, the requirement of building LAN Media headers can also be removed with the present invention, from the protocol device drivers. The protocol device drivers just append the destination address on the local LAN as required for each specific protocol. The protocol stacks no longer need to have a unique device driver for each unique LAN connection. One device driver can now be used for all LAN connections. This requirement was removed by placing code in the channel attached platform which builds the LAN Media headers. The LAN media headers are built as the protocol data is removed from the block by the "deblocker" code.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. In a computing network environment having a gateway device, said gateway device being electronically connected from one end to at least one initiating host and at the other end to at least one local area network through which a plurality of hosts are connected to said gateway device, said computer environment using a Multi-path channel communication protocol, a method of allowing any initiating host to establish communications with any receiving host, said method comprising the steps of:

performing an initialization step during which all possible functions provided by any type of communication platform is specified and stored in a special function table accessible by said gateway device;

performing a querying step during which said functions supported by said associated communication platform is determined;

identifying in said special function table which of said functions are provided and supported by said associated communication platform;

dynamically monitoring alterations, additions and deletions from said functions supported by said associated communication platform and making necessary modifications in said special function table so that said table is kept updated and all available functions are provided at all times;

allowing any host connected to said gateway device to obtain a list of all available functions supported by said communication platform at any one time and;

allowing any host to select any one of said functions available and supported by said communication platform at any one time by issuing a command after obtaining list of all available functions.

2. The method of claim 1, wherein said communication platform is an integrated platform.

3. The method of claim 1, wherein said communication platform is an open systems adapter platform.

4. The method of claim 3, wherein said computing environment uses Novell IPX communication protocol.

5. The method of claim 4, wherein said functions supported by open system adapter can include RIP function.

6. The method of claim 4, wherein said functions supported by open system adapter can include SAP function(s).

7. The method of claim 4, wherein said functions supported by open system adapter can include Broadcast Filtering.

8. The method of claim 1, wherein said gateway device is uses LAN Channel Station Protocol instead.

9. The method of claim 1, wherein said gateway device is connected to a plurality of local area networks.

10. The method of claim 9, wherein said local area networks each are of different type and associated with them different and independent communication platforms.

* * * * *